United States Patent [19]

Dolata et al.

[11] 4,385,532

[45] May 31, 1983

[54] SHARPENING DEVICE FOR A BACK-SHARPENED SAW CHAIN OF A MOTOR CHAIN SAW

[75] Inventors: Hans Dolata, Waiblingen; Werner Meyle, Murr; Hans-Georg Kaiser, Köngen; Gerhard Odenwald; Günther Weyda, both of Waiblingen, all of Fed. Rep. of Germany

[73] Assignee: Andreas Stihl, Waiblingen, Fed. Rep. of Germany

[21] Appl. No.: 193,897

[22] Filed: Oct. 6, 1980

[30] Foreign Application Priority Data

Oct. 5, 1979 [DE] Fed. Rep. of Germany ....... 2940430

[51] Int. Cl.³ .............................................. B23D 63/16
[52] U.S. Cl. .................................................... 76/25 A
[58] Field of Search ...................... 76/25 A, 37; 30/138

[56] References Cited

U.S. PATENT DOCUMENTS

| | | | |
|---|---|---|---|
| 3,361,012 | 1/1968 | Fullerton | 76/25 A |
| 3,529,495 | 9/1970 | Graversen | 76/25 A |
| 3,534,638 | 10/1970 | Van Ourkerk | 76/25 A |
| 3,603,179 | 9/1971 | Stihl | 76/37 |

*Primary Examiner*—Roscoe V. Parker
*Attorney, Agent, or Firm*—Becker & Becker

[57] ABSTRACT

A sharpening device, for the saw chain of a motor chain saw, with a holding device for a sharpening element which is arranged in the region of the reversing radius and is curved approximately concavely with respect to the center of this reversing radius. The sharpening element is seated upon an adjustment lever which is pivotable in a direction toward the saw chain. This lever cooperates with a screw device which determines the feed path of the sharpening element. An actuating handle is provided for the feeding of the sharpening element; this handle is arranged on that side of the housing of the chain saw located remote from the free reversing end of the guide bar of the saw chain. The actuating handle is preferably releasably secured in the grasping range of the front handle of the chain saw. The actuating handle is connected by a yieldable shaft with a threaded bolt associated with the feeding device, and the nut piece of the threaded bolt is seated in an extension of a support plate connected with the guide bar, that end segment of the threaded bolt which projects freely from the nut piece pressing against an adjustment lever pivotally journalled on the support plate. The adjustment lever supports the sharpening element and is spring biased, with the spring endeavoring to pivot the adjustment lever, together with the sharpening element, in a radial direction against the axis of the reversing chain gear.

16 Claims, 24 Drawing Figures

SHARPENING DEVICE FOR A BACK-SHARPENED SAW CHAIN OF A MOTOR CHAIN SAW

The present invention relates to a sharpening device, for the saw chain of a motor chain saw, with a holding device for a sharpening element which is arranged in the region of the reversing chain wheel or sprocket, and is bent or curved concavely and approximately coaxially with respect to the axis of rotation of the reversing chain wheel. The sharpening element is located or seated upon an adjustment lever which is pivotable in a direction toward the saw chain. This adjustment lever cooperates with a screw device which determines the feeding path of the sharpening element.

A motor chain saw disclosed by U.S. Pat. No. 3,361,012 Fullerton issued Jan. 2, 1968 is provided with a sharpening device which can be fastened on a free end segment of a guide rail or bar for the saw chain by means of two screw bolts insertable through the guide bar and secured by wing nuts threaded to the screw bolts. On the holding apparatus of this sharpening device, there is provided a curved adjustment lever which is substantially coaxial with the axis of rotation of a reversing chain wheel or sprocket in the vicinity of the sharpening device. This adjustment lever supports a grinding element which is made in one piece in a conventional manner, for example of corundum, comprising a segment of a grinding body forming a cylindrical pipe or tube. A tensioning pin or truing-up trunnion, which serves as a pivot shaft for the adjustment lever and extends parallel to the axis of rotation of the chain reversing wheel, must be released with a suitably formed tubular key for feeding the grinding body, and a set screw or stop screw located across from the free end segment of the adjustment lever must be turned back by the particularly desired feeding measurement. The feeding of the grinding element is accordingly quite time consuming, and for the purpose of avoiding accidents can practically be carried out only when the saw chain is stopped.

The previously known solution includes the danger that the operator of the chain saw tries to carry out the feeding of the sharpening device during the running of the saw chain, and in doing so comes into engagement with the saw chain, which rotates at idling at a speed of 15 to 18 m/second; the operator is thus severely injured under such circumstances.

The object of the present invention is to provide a sharpening device which during running of the motor chain saw permits an accurate, fine adjustment of the sharpening element without any danger of accident or material damage existing as a consequence of operational errors.

This object, and other objects and advantages of the present invention, will appear more clearly from the following specification in connection with the accompanying drawings, in which.

The sharpening device of the present invention is characterized primarily by providing an actuating handle for the feeding of the sharpening element; this handle is arranged on that side of the housing of the chain saw located remote in space from the free reversing end of the guide bar of the saw chain.

The actuating handle can advantageously be secured, preferably releaseably, in the grasping range of the front handle of the chain saw. An especially simple operation or handling results during the feeding if the actuating handle is installable upon the front handle or hand grip by means of a resilient clamp.

By way of the inventive embodiment and arrangement of the actuating handle, it is possible for the operator, before and during the sharpening procedure, to grasp the rear handle with one hand, and in doing so simultaneously operates the accelerator or gas-actuating lever, while with the other hand grasp the front handle or grip and without releasing the same, with one finger, for example with the thumb of the left hand, be able to actuate the actuating handle for the feeding of the sharpening element.

According to a further embodiment of the present invention, the actuating handle can be embodied as a rotary button or knob, preferably with a knurled or edged peripheral surface. Advantageously, this rotary knob or button can be connected by a resilient shaft with a threaded bolt associated with the feeding apparatus. A nut or female piece of the threaded bolt is positioned or seated in an extension of a support or carrier plate connected with the guide bar, and that end segment of the threaded bolt which projects freely from the nut piece presses against an adjustment lever pivotally journaled on the support plate. The adjustment lever supports the sharpening element and is spring biased, with the spring endeavoring to pivot the adjustment lever, together with the sharpening element, in a radial direction against the axis of the reversing chain wheel.

According to further embodiments of the present invention, the adjustment lever may be pivotably guided parallel to a support plate fastened to the guide bar by means of a screw connection; the adjustment lever may also have an edge bead which projects at right angles from the support plate, is cylindrically embodied over an angle of approximately 70° in the region of the reversing wheel, and forms the engagement surface for the outwardly directed back side of the sharpening element.

The spring may be embodied as a round bar spring, the middle segment thereof having a bulge or curvature which presses against the sharpening element or the adjustment lever. The support plate may have a downwardly projecting support leg. Two flanges may be provided at the free end of the guide bar, with these flanges being tensioned or stressed against each other, by means of a screw which passes therethrough, and also being stressed against the guide bar; one of the flanges serves as a support plate. Both flanges may have embossments or bulges on the inner sides thereof facing each other, said bulges being concentric to the axis of rotation of the reversing chain wheel or the screw, with the rivet heads of the chain links being located across therefrom with a small axial play.

The sharpening element may be embodied as a composite body having a metal support upon which a heat-resistant intermediate layer, especially of fiber, is seated, which in turn forms the base or underlayer for a non-self-supporting grinding-medium layer. Such a sharpening element may have an at least substantially U-shaped cross section, the outer legs of which are directed outwardly at an incline, especially at an angle of incline of 60°. The lower end segment of the support may have an insertion slot or groove for fastening upon a holding element which is provided on the feed or adjustment lever. The support may have an embossment or bulge which projects toward the outer side and serves for insertion in a bore in the adjustment lever. The grinding-medium layer may comprise corundum particles embedded in synthetic material, with the particles being fastened by a binding agent especially adhesive, to the fiber intermediate layer.

Figure 1:
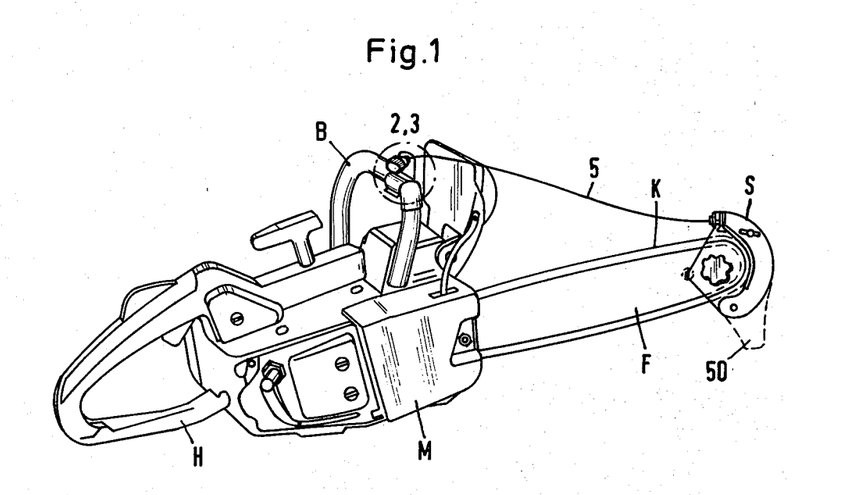
FIG. 1 shows a motor chain saw with an inventive sharpening device illustrated in a perspective, partially schematic representation.
Figures 4, 6, 7:
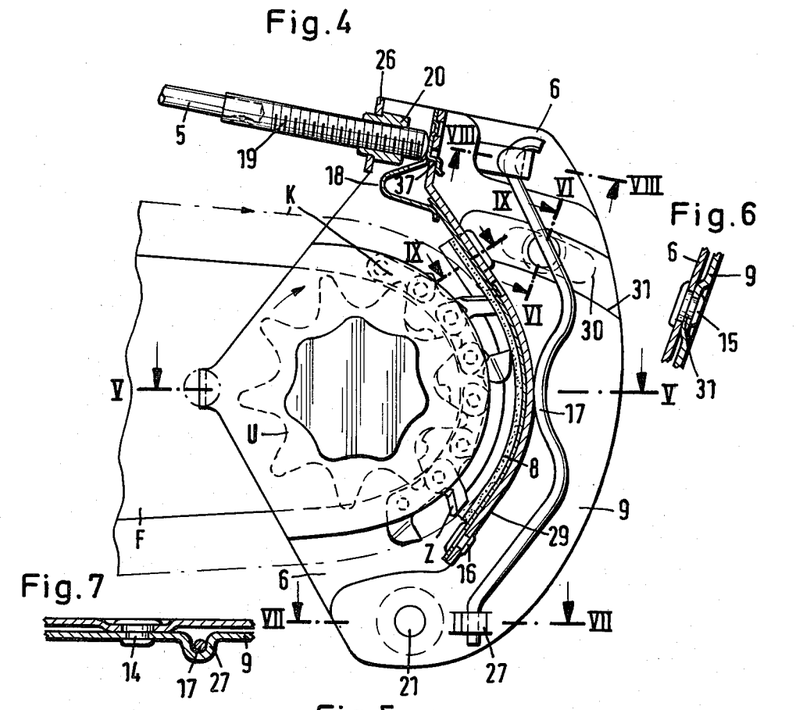
FIG. 4 shows the sharpening device in side view and partially in section.
FIG. 6 is a partial section taken along line VI—VI of FIG. 4.
FIG. 7 is a section taken through line VII—VII of FIG. 4 through the pivot bearing of the adjustment lever associated with the sharpening device.

Referring now to the drawings in detail, the motor chain saw illustrated in FIG. 1 has a motor housing M which surrounds the drive motor (not shown), for example a single-cylinder two-cycle internal combustion engine. The motor housing M carries or supports a guide rail or bar F upon which the saw chain K (indicated in FIG. 1 and in FIG. 4) circulates. The saw chain is supported over 160° by means of a reversing chain wheel or sprocket U. The axis of rotation A of the reversing chain wheel U is indicated in FIG. 4.

The motor chain saw, at its rear end, has a handle H which is attached to the motor housing M and extends parallel to the guide bar F. By means of this handle, the motor chain saw can be reliably guided in its longitudinal direction during operation, particularly since the operator (not illustrated in the drawing) can with a left hand grasp a bracket-like handle B secured on the motor housing M, and accordingly, in the operating position represented in FIG. 1, the operator can hold the guide bar F in the desired inclined position with respect to the horizontal.

A sharpening device S is attached to the free end segment of the guide bar F in the region of the reversing chain wheel or sprocket U. With this sharpening device S, the cutting teeth Z (FIG. 4) of the cutting chain members (not shown in detail) can be resharpened or reground, at the tooth back and at the tooth front, in such a way that the cutting edge necessary for the cutting work can be established again on the cutting teeth by regrinding.

A sharpening element 8 embodied as a throw-away structural part and illustrated in further detail in FIGS. 10 through 14 is associated with the sharpening device S. The sharpening element 8 extends over approximately 70° substantially concentrically with respect to the axis of rotation A of the reversing chain wheel U, and is fastened to an adjustment lever 9 about a pivot shaft 21, which is parallel to the axis of rotation A, which is pivotable against the saw chain in such a way that the saw chain can be ground during passage along the sharpening element 8. The pivot pin 21 is fastened to a left flange 6 which serves as a support plate of the sharpening device. This flange 6 projects radially considerably over a right side flange 7, which can be tightened against the guide bar F with the aid of a star-grip (grip for clamp screw) 10 and a fastening screw 11 engaging therein and is fastened with the aid of a nut 12 in the recessed or deepened central zone of the left flange 6.

Figure 2:
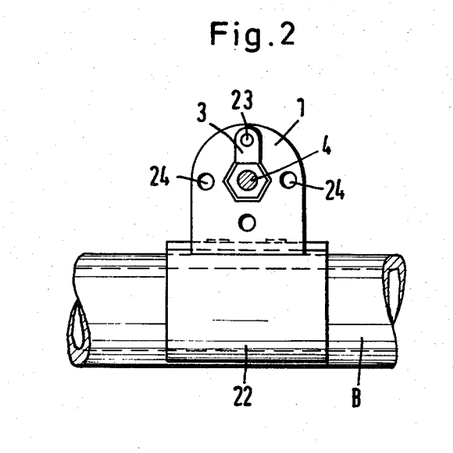
FIG. 2 shows a part of the inventive actuating handle of the sharpening device.
Figure 3:
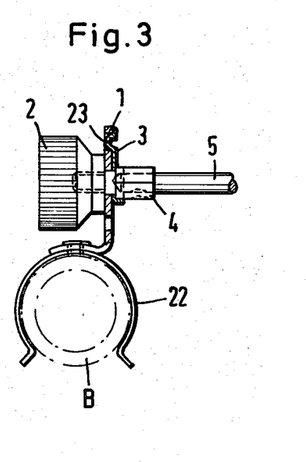
FIG. 3 shows the actuating handle of FIG. 2 in section and partially in a side view.

The sharpening element 8, described in more detail hereafter, and the adjustment lever 9 which supports the sharpening element 8, are subjected to the pressure of a round bar spring 17 which seeks to press the adjustment lever 9 about the pivot pin 21 counterclockwise radially against the axis A and accordingly against the path of the cutting teeth Z. For the purpose of being able to undertake the feeding of the sharpening element 8 against the cutting teeth during the rotation of the saw chain at a speed of 12 to 15 m/second in a sensitive and accurately dosed manner, a remote actuation handle, illustrated in greater detail in FIGS. 2 and 3, is provided. This handle is fastened to the handle bracket B on that side of the housing of the chain saw in a location remote in spaced relationship from the free reversing end of the guide bar F of the saw chain. A clamping strap 22 is provided for releaseable fastening of the actuating handle to the bracket B. This clamping strap 22 is connected with a holder 1 which projects approximately radially in the clamping position; the holder 1 forms the support for a cylindrical adjustment knob 2, which is provided with serrations or ridges along the peripheral surface thereof, and for a bolt 4 carrying this adjustment knob 2. The bolt 4, which has a hexagonal shape in cross section, supports a narrow leaf spring 3 on that side thereof facing the holder 1. With an end segment 23 which is precurved against the holder 1, the leaf spring 3 sequentially snaps into one of four latching bores 24 during rotation of the adjusted knob 2.

The rotary knob 2 is connected by means of a yieldable shaft 5 to a threaded bolt 19 associated with a feeding device. A threaded sleeve 20 of the threaded bolt 19 serves as a nut piece and is fastened in an extension 26, of the left flange 6, which is angled off from the plane of the drawing. The free end segment of the screw or threaded bolt 19 projects from the threaded sleeve 20 and thereby supports the adjustment lever 9 against the pressure of the round bar spring 17. The farther the free end segment of the screw bolt 19 is turned or rotated out from the threaded sleeve 20 by rotation of the adjustment knob or button 2, the greater the sharpening element 8 is lifted from the cutting teeth Z and can therefore be fed against the cutting teeth in a very finely dosed manner by turning the adjustment knob 2 in the opposite direction.

Figures 5, 8, 9:
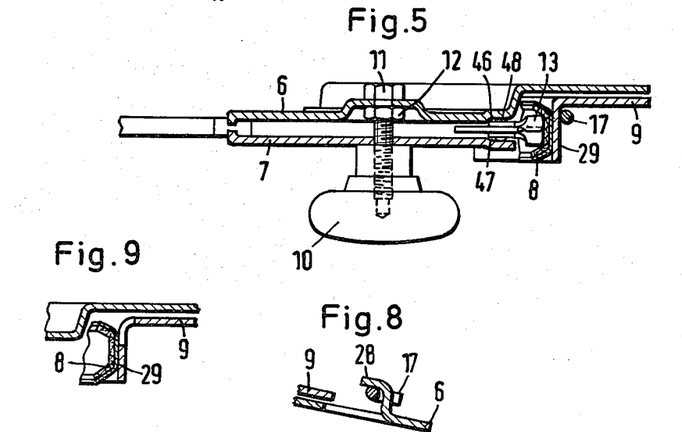
FIG. 5 shows an axial section taken along line V—V of FIG. 4 through the sharpening device.
FIG. 8 is a partial section taken along line VIII—VIII of FIG. 4.
FIG. 9 is a section taken along line IX—IX of FIG. 4 through the adjustment lever and the sharpening element carried by the adjustment lever.
Figure 10:
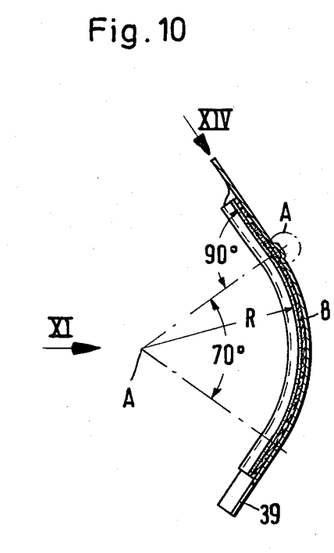
FIG. 10 is a longitudinal section of the sharpening element.

As shown in FIG. 7, the lower end segment of the round bar spring 17 (FIG. 4) is inserted in a holding bridge 27 which is pressed out of the plane of the adjustment lever 9 by a stamping cut. The other, slightly hook-like bent end segment of the spring 17 is placed in a flap or tongue 28 which is stamped out of the plane of the left flange 6 (FIG. 8). The double bent middle segment of the spring is supported under elastic tension against the cylindrically bent edge bead 29, which is formed on the adjustment lever 9 and on which the sharpening element 8 engages.

As shown in FIG. 7, a rivet 14 serves as the pivot pin 21 for the adjustment lever 9, while, as shown in FIG. 6, a rivet 15 serves for guidance of the adjustment lever 9 upon the left flange 6. This rivet 15 is guided in an elongated slot 30 in a depression or recess 31 of the adjustment lever 9.

Figures 11, 12, 14:
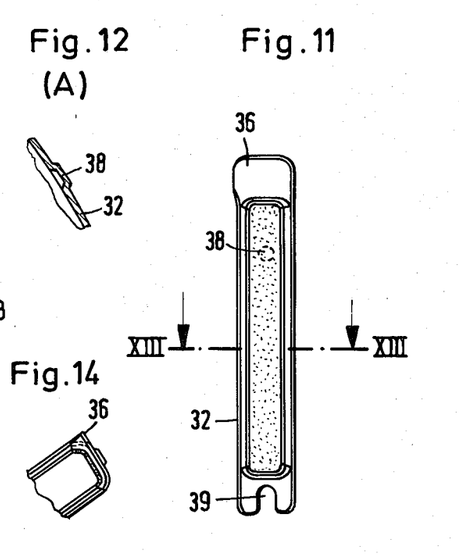
FIG. 11 shows a radial plan view of the sharpening element as seen in the direction of the arrow XI in FIG. 10.
FIG. 12 is an enlargement of the dot-dash line circle A of FIG. 10.
FIG. 14 is an end view of the sharpening element as seen in the direction of arrow XIV in FIG. 10.

According to FIGS. 10 through 14, the sharpening element, which is embodied as a throw-away part, has a thin walled carrier or support plate 32 illustrated in FIG. 11 in a view from the axis of rotation A. The support plate 32 is cylindrically bent over a range of approximately 70°, and is provided with edge zones 33 and 34 (FIG. 13) which adjoin the cylindrically curved middle segment 35 in such a way that they form an angle of approximately 50°-80°, preferably 60°, with this middle segment. The support plate 32 has a flat upper end segment 36 with which, with the aid of a double-bent leaf spring 18 (FIG. 4), which engages with an extension 37 into a drill hole (not illustrated) in the edge bead 29, the plate 32 is kept tensioned on the edge bead 29 of the adjustment lever 9 under the pressure of the round bar spring 17 against the screw bolt 19 of the adjustment device. At the transition region from the cylindrical middle segment 35 to the end segment 36, which forms a right-angled extension or projection, there is provided at a location A an embossment or bulge 38, with which the support 32 can engage in a suitable recess in the edge bead 29 of the adjustment lever 9, while the lower end segment of the support plate 32 is made fork-like by a longitudinally symmetrical stamped-out portion 39 in such a manner that the stamped-out portion 39 can engage in a further rivet 16 (FIG. 4) and is capable of being fastened therewith on the edge bead 29.

Figure 13:
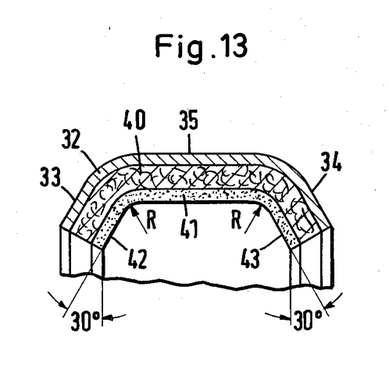
FIG. 13 is an enlarged illustration of a section through the sharpening element of FIG. 10 taken along line XIII—XIII in FIG. 11.

In accordance with the enlarged cross section through the sharpening element illustrated in FIG. 13, the support 32 is lined along the inner side thereof with a coating or covering of fiber. This fiber layer 40 serves as a carrier for a binding or adhering, nonself-supporting, grinding-medium layer 41, which follows the contour of the support plate 32 and, with its inclined side surfaces 42 and 43, serves for grinding the tooth front of the individual teeth Z, while the tooth backs of the cutting teeth Z are ground by the axially parallel middle segment of the sharpening element. In doing so, the fiber layer 40 assures emergency operating characteristics of the sharpening element 8 when the grinding-medium layer 41 is used up.

As shown by the cross section through both flanges 6 and 7 illustrated in FIG. 5, an embossment or bulge 46 is provided on the flange 6 concentrically to the axis A or to the fastening screw 11. This bulge 46, together with a similarly embodied embossment or bulge 47 on the right flange 7, results in an accurate tolerance gap in which the saw chain is stabilized axially before passing into the region of the grinding element 8. The rivet heads 48 of the transverse rivets, which connect the chain members with one another, project with only a very nominal spacing from the respective inner sides of these two bulges 46 and 47, and thereby achieve that the tooth fronts of the cutting teeth are ground against the inclined or slanted-off portions 42 or 43.

Figures 15, 17:
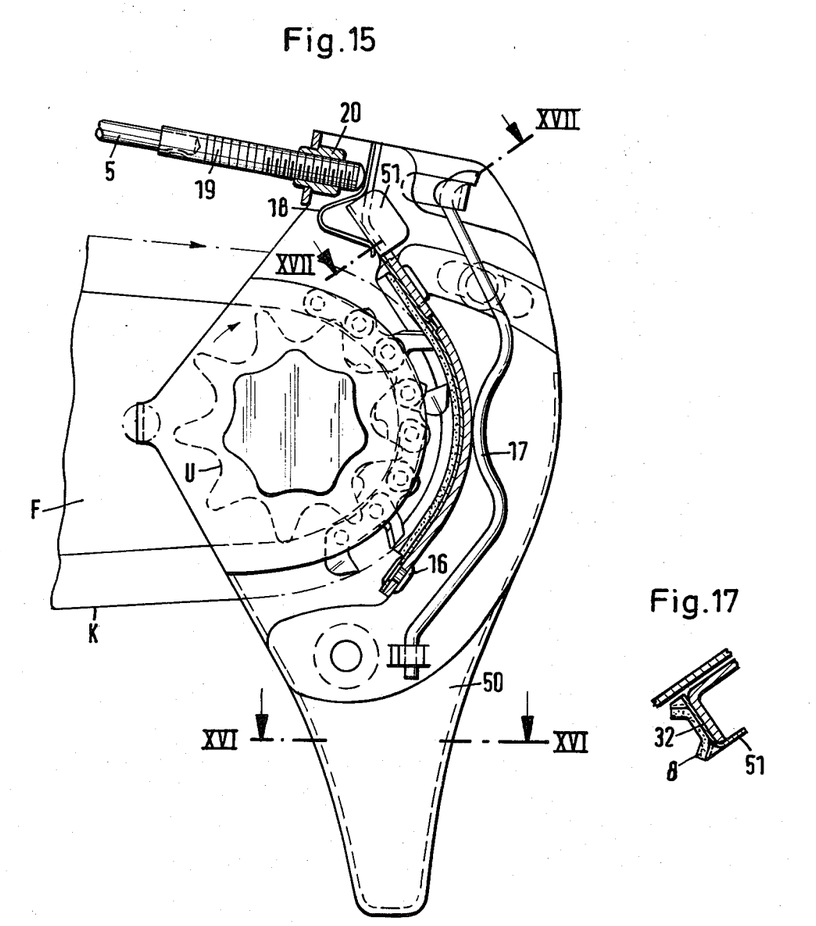
FIG. 15 illustrates a modified embodiment with which the carrier plate of the sharpening device is provided with an extension serving as a support leg.
FIG. 17 is a section through the adjustment lever of the sharpening device taken along line XVII—XVII of FIG. 15.
Figure 16:
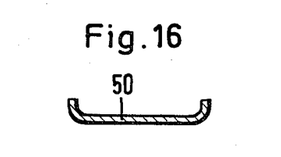
FIG. 16 is a section through this support leg taken along line XVI—XVI of FIG. 15.
Figure 18:
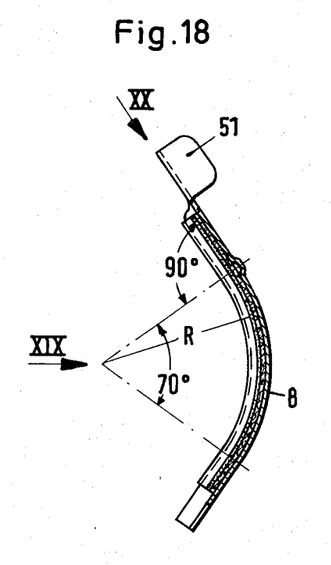
FIG. 18 is a longitudinal section of the sharpening element used in FIG. 15 and modified with respect to the sharpening element of FIG. 10.
Figure 19:
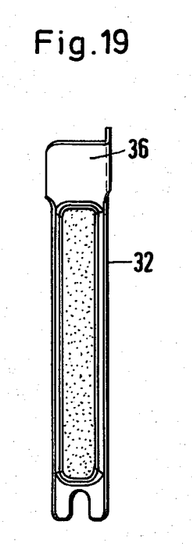
FIG. 19 is a radial view of the sharpening element as seen in the direction of arrow XIX in FIG. 18.
Figure 20:
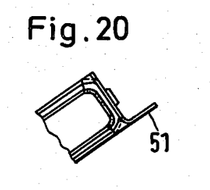
FIG. 20 is an end plan view seen in the direction of arrow XX in FIG. 18.
Figures 21, 24:
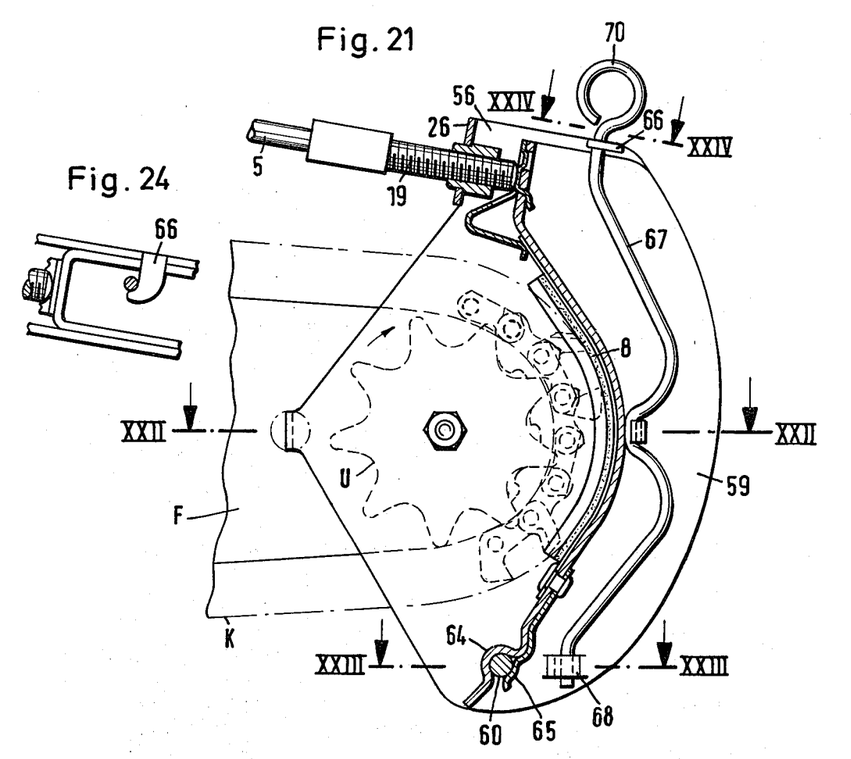
FIG. 21 shows a modified sharpening device in combination with a kick-back protection in a side view as well as partially in section.
FIG. 24 is a partial section taken along line XXIV—XXIV of FIG. 21.
Figure 22:
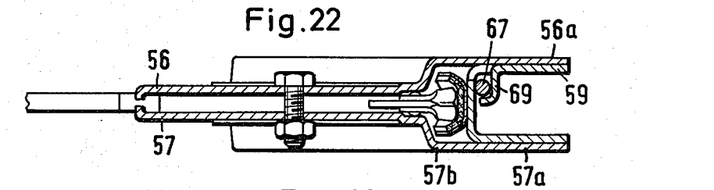
FIG. 22 shows a cross section taken along line XXII—XXII of FIG. 21.
Figure 23:
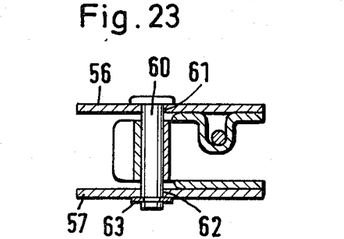
FIG. 23 is a cross section taken along line XXIII—XXIII of FIG. 21 through the lower pivot bearing of the modified sharpening element according to FIG. 21.

With the embodiment according to FIG. 15, the left flange 6 is provided with a downwardly directed extension 50 which, as shown in FIG. 16, has a U-shaped cross section and permits placement of the motor chain saw during the sharpening procedure upon a base, for example upon the ground. As shown by the cross section illustrated in FIG. 17, the support plate 32 of the sharpening element 8, which is otherwise constructed without any changes with respect to the features shown in FIG. 13, can be extended or lengthened in the region of the upper end zone 36 and can have a laterally projecting flap or tongue 51. This assures that the introduction and latching of the support plate 32 can occur only when the lower fork-like segment with the recess 39 is seated exactly in the rivet 16, which serves as a receiving bolt or pin. Only then can the upper segment be swung or pivoted laterally below the spring 18. For this purpose, the laterally projecting flap 51 serves for better lateral pressing-in of the upper segment of the sharpening element and simultaneously forms an abutment in the engaged position of the sharpening element. Thereby, in addition to the bulge 38 which serves as a centering cam, there is accordingly an abutment which defines and limits the position of the sharpening element 8. Additionally, the flap 51 serves to facilitate the removal of the sharpening element 8 from the sharpening position illustrated in FIG. 15 without requiring special tools because the flap 51 can be used as a handle. The inventive sharpening device, according to FIGS. 21 through 24, can also be combined in such a way with a safety device, which protects against plunge-cutting, that the motor saw continuously remains equipped with the safety device, and the guide bar F accordingly is utilized only for cross cutting. The two side plates 56 and 57 serve on the front contours 56a and 57a as kickback protection as well as for receiving the adjustment lever 59, with the sharpening element 8, during the resharpening. For the resharpening work, the sharpening device is assembled in a simple manner between the side plates 56 and 57, which are arranged parallel to each other in the front region of the free end of the guide bar F. To this end, as shown in FIG. 21, the two side plates 56 and 57 are embodied in such a way that they can form the adjustment lever 59 as well as the receiving means for the adjustment lever, namely the rotary pin or bolt 21, and the receiving means for the screw bolt 19 seated on the end of the yieldable shaft 5. For this purpose, in the same manner as illustrated in FIG. 14, a flap-shaped extension 26 is bent out of the plane of the left side plate 56. Additionally, the free ends of the side plates 56 and 57 are bent off outwardly at angles in such a manner that a parallel side plate segment 56a or 57a is formed which together with the counter plate and the bent-off at angles portion 57b has an approximately U-form or shape. The adjustment lever 59, embodied in a corresponding U-shape, fits into this U-form or shape. The adjustment lever 59 is guided laterally between the plate segments 56a and 57a which are effective as legs or side plates. Furthermore, provision is made that a pin or bolt 60, which is illustrated in FIG. 23 and about which the sharpening element 8 pivots, is inserted in a corresponding bore 61 or 62 in the side plates 56 or 57, and is latched by a spring-ring securing means or safety mechanism 63. Furthermore, according to FIG. 21, a slip-on latch or catch is provided for the bolt 60 and is formed from an angled-off leaf spring 65 and the angled-off end portion 64 of the adjustment lever 59. With this latch, the adjustment lever 59 can be pushed over or snapped on, and can then be securely mounted.

A receiving flap or tab 66 is furthermore bent on the left side plate 56, and supports the round-bar spring 67 which is bent differently from the embodiment shown in FIGS. 4 and 15. The other end segment of this spring 67 is received in a bridge 68 produced by bend stamping, and the middle segment of the spring 67 is held by a nose 69 cut out of the side wall of the U-shaped adjustment lever 59. By means of simple bending-in and hanging or suspending of the upper portion of the spring 67, which is provided with an eyelet 70, the spring 67 is tensioned for the sharpening procedure, so that its functioning during the readjustment or resetting of the sharpening element, as described above, can be fulfilled.

For the resetting, it is advantageous if an adjusting scale is provided on the adjustment knob 2, which is held upon the guide bracket B, to make it possible for the operator to also sensitively undertake the feeding between the latching spaces determined by the latching bores 24, and to avoid a jerky feeding which could lead to damaging of the sharpening element.

In contrast to the already known one-way sharpening elements, which have a synthetic material carrier for the grinding-medium layer, with the sharpening element 8 described in the foregoing paragraphs, there is provided a carrier or support made or shaped from a metal plate 32, which can take up and eliminate the large heat quantities arising during the grinding without changing the stability or rigidity. This solution additionally brings about the advantage that the thin grinding-medium layer 41 of FIG. 31, which comprises corundum particles embedded in synthetic material, can be applied to the fiber intermediate layer 40 by means of a binding agent, for example an adhesive. This fiber intermediate layer 40, in turn, can likewise be fastened by adhesive in a simple manner to the metallic carrier or support 32. These three layers accordingly result in a composite body of high stability in shape or form which additionally is embodied and profiled in such a manner that it can grind not only the top or roof of a tooth Z, but also a depth limiter, as well as the tooth front of a cutting tooth in the region of the transition R from the axially parallel cylinder zone to the two side surfaces 42 and 43. Hereby there is attained both a high stability or rigidity of the sharpening element as well as a sharpening procedure which protects or conserves the material of the cutting teeth Z.

The inventive device can be made in a simple manner of synthetic material in a cost-advantageous manner, whereby, aside from the economical and weight advantages, there results the further advantage that arresting means, cams, and the like can be produced integrally with the base body.

The present invention is, of course, in no way restricted to the specific disclosure of the specification and drawings, but also encompasses any modifications within the scope of the appended claims.

What we claim is:

1. A sharpening device for the saw chain of a motor chain saw having a housing for the motor of said chain saw, and a guide bar for said saw chain, said guide bar having one end connected to said housing, with the other end being a free reversing end, with a reversing radius, for reversing the direction of travel of said saw chain, said sharpening device comprising:

a sharpening element wich is arranged in the region of said free reversing end and is curved approximately concavely with respect to the center or axis of rotation of said reversing radius;

a holding device, for said sharpening element, connected to said guide bar and including at least an adjustment lever, which is pivotable toward said saw chain and upon which said sharpening element is seated;

a screw drive operatively connected to said adjustment lever and cooperating therewith, said screw drive determining the feed path of said sharpening element;

an actuating handle operatively connected to said housing on a side thereof remote from said free reversing end, said actuation handle also being operatively connected to said screw drive for adjustment of said sharpening element, said housing including a forward hand grip, and said actuating handle being connected within the grasping range of said hand grip, said actuating handle being a rotary knob; and said screw drive being a threaded bolt, and including: a yieldable shaft for effecting connection of said rotary knob to said threaded bolt; a support plate forming part of said holding device, said adjustment lever being pivotably mounted to said support plate, which in turn is connected to said guide bar, said support plate being provided with an extension; a female piece seated in said extension for receiving said threaded bolt in such a way that said bolt has a free end section remote from said rotary knob, said free end section pressing against said adjustment lever; and a spring operatively connected to said adjustment lever for biasing same, said spring endeavoring to pivot said adjustment lever, together with said sharpening element, in a radial direction against said axis of rotation of said reversing radius.

2. A sharpening device according to claim 1, in which said adjustment lever is guided parallel to said support plate and is provided with an edge bead which extends at right angles from said carrier plate and is cylindrically embodied over an angle of approximately 70° in the region of said reversing radius, said edge bead forming the engagement surface for the outwardly directed back side of said sharpening element.

3. A sharpening device according to claim 1, in which said spring is a round bar spring, the middle segment of which is provided with a curvature which presses against said sharpening element.

4. A sharpening device according to claim 1, in which said support plate is provided with a downwardly directed support leg.

5. A sharpening device according to claim 1, in which said actuating handle is releasably connected.

6. A sharpening device according to claim 1, in which said rotary knob has a profiled peripheral surface.

7. A sharpening device for the saw chain of a motor chain saw having a housing for the motor of said chain saw, and a guide bar for said saw chain, said guide bar having one end connected to said housing, with the other end being a free reversing end, with a reversing radius, for reversing the direction of travel of said saw chain, said sharpening device comprising:

a sharpening element which is arranged in the region of said free reversing end and is curved approximately concavely with respect to the center or axis of rotation of said reversing radius;

a holding device, for said sharpening element, connected to said guide bar and including at least an adjustment lever, which is pivotable toward said saw chain and upon which said sharpening element is seated;

a screw drive operatively connected to said adjustment lever and cooperating therewith, said screw drive determining the feed path of said sharpening element;

an actuating handle operatively connected to said housing on a side thereof remote from said free reversing end, said actuating handle also being operatively connected to said screw drive for adjustment of said sharpening element, said holding device including two flanges provided at said free reversing end of said guide bar, and a screw which passes through said flanges tensioning said flanges against one another and against said guide bar, one of said flanges serving as a support plate for said adjustment lever.

8. A sharpening device according to claim 7, in which both flanges are provided with bulges on the inner sides thereof facing each other, said bulges being concentric to said screw, and in which said saw chain is provided with chain links having rivet heads, said bulges being spaced from said rivet heads with slight axial play.

9. A sharpening device according to claim 7, in which said sharpening element is a composite body comprising a metallic support, an intermediate layer seated upon said support, and a nonself-supporting grinding-medium layer supported by said intermediate layer.

10. A sharpening device according to claim 9, in which said intermediate layer is a fiber layer.

11. A sharpening device according to claim 9, in which said sharpening element has an at least substantially U-shaped cross section, the outer legs of which are directed outwardly at an incline.

12. A sharpening device according to claim 11, in which said legs extend outwardly at an incline of 60°.

13. A sharpening device according to claim 9, in which said adjustment lever is provided with a holding element, and said support is provided with a lower end segment having an insertion slot for fastening on said holding element.

14. A sharpening device according to claim 9, in which said adjustment lever is provided with a bore, and in which said support is provided with an outwardly projecting bulge for insertion into said bore.

15. A sharpening device according to claim 9, in which said grinding-medium layer comprises corundum particles embedded in synthetic material, said particles being fastened to said intermediate layer by means of a binding agent.

16. A sharpening device according to claim 15, in which said binding agent is an adhesive.

* * * * *